United States Patent
Huber et al.

(10) Patent No.: US 8,086,810 B2
(45) Date of Patent: Dec. 27, 2011

(54) RAPID DEFRAGMENTATION OF STORAGE VOLUMES

(75) Inventors: Harold Steven Huber, Tucson, AZ (US); David Charles Reed, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 12/354,744

(22) Filed: Jan. 15, 2009

(65) Prior Publication Data
US 2010/0180093 A1 Jul. 15, 2010

(51) Int. Cl.
*G06F 13/00* (2006.01)
*G06F 13/28* (2006.01)
*G06F 7/00* (2006.01)
*G06F 17/00* (2006.01)

(52) U.S. Cl. ................. 711/165; 711/E12.006; 707/693
(58) Field of Classification Search .................. 711/165, 711/E12.006; 707/693
See application file for complete search history.

(56) References Cited

U.S. PATENT DOCUMENTS

| 4,771,375 | A | 9/1988 | Beglin et al. |
| 5,930,828 | A | 7/1999 | Jensen et al. |
| 6,594,674 | B1 | 7/2003 | Kaplan et al. |
| 7,107,385 | B2 | 9/2006 | Rajan et al. |
| 2004/0133602 | A1 | 7/2004 | Kusters et al. |
| 2006/0130316 | A1* | 6/2006 | Takase et al. ............. 29/603.09 |
| 2007/0113036 | A1* | 5/2007 | Gal-Oz ........................ 711/165 |

OTHER PUBLICATIONS

Lovelace, Mary et al., "z/OS V1R8 DFMS Technical Update," IBM Redbooks, SG24-7435-00, Jan. 22, 2008, 592 pages.

* cited by examiner

*Primary Examiner* — Edward Dudek, Jr.
(74) *Attorney, Agent, or Firm* — Griffiths & Seaton PLLC

(57) ABSTRACT

Various embodiments for rapid defragmentation of storage volumes in a computing environment are provided. A plurality of source data sets is copied from the fragmented storage volume to a plurality of target data sets on an additional storage volume. The plurality of source data sets is placed on the additional storage volume as the plurality of target data sets in an unfragmented order. A first volume serial number (VOLSER) of the fragmented storage volume is swapped with a second VOLSER of the additional storage volume. The fragmented storage volume is varied offline, and the additional storage volume is varied online. The computing environment recognizes the additional storage volume having the plurality of target data sets placed in the unfragmented order.

20 Claims, 3 Drawing Sheets

RAPID DEFRAGMENTATION OF STORAGE VOLUMES

BACKGROUND OF THE INVENTION

1. Field of the Invention

The present invention relates in general to computers, and more particularly to a method, system, and computer program product for rapid defragmentation of storage volumes in a computing environment.

2. Description of the Related Art

The majority of businesses in the world today use computers and computer systems to store and manage information. In the context of administering computer systems, defragmentation refers to a process that reduces the amount of fragmentation in file systems. Defragmentation reduces this fragmentation by physically reorganizing the contents of a storage device to store the pieces of each file in a contiguous manner. Defragmentation also attempts to create larger regions of free space using compaction to impede the return of fragmentation.

Fragmentation occurs when the computer system cannot or will not allocate enough contiguous space to store a complete file as a unit. Instead, the computer system fragments the file, placing portions of the file in spaces between additional files. Larger files and greater numbers of these files contribute to fragmentation and consequent performance loss. Defragmentation attempts to alleviate these problems.

SUMMARY OF THE INVENTION

As clients in a computing environment use direct access storage devices (DASD), the constant adding and deleting of different size data sets causes fragmentation over time. Eventually the storage devices must be defragmented. In many computer systems, storage devices are classified by volumes, which are groups of information. Volumes may be physical volumes such as a disk or a disk partition or logical (virtual) volumes. Computing environments often implement a utility to perform the defragmentation functionality on volumes. In the z/OS® computer platform, for example, a volume is generally defragmented using the Data Set Services (DFSMSdss) utility. DFSMSdss defragmentations may incur a substantial amount of time. In addition, during the defragmentation process, access to the particular volume undergoing defragmentation is locked.

In a volume defragmentation methodology such as DFSMSdss, the volume is first analyzed. This is followed by several passes of data movement as fragmentation is reduced and extents are potentially consolidated. This methodology again incurs time and resource allocation while the defragmentation is performed. In light of the foregoing, a need exists for a mechanism to provide a more rapid defragmentation of volumes in a computing environment.

Accordingly, in one embodiment, by way of example only, a method for rapid defragmentation of a fragmented storage volume in a computing environment is provided. A plurality of source data sets is copied from the fragmented storage volume to a plurality of target data sets on an additional storage volume. The plurality of source data sets is placed on the additional storage volume as the plurality of target data sets in an unfragmented order. A first volume serial number (VOLSER) of the fragmented storage volume is swapped with a second VOLSER of the additional storage volume. The fragmented storage volume is varied offline, and the additional storage volume is varied online. The computing environment recognizes the additional storage volume having the plurality of target data sets placed in the unfragmented order.

In an additional embodiment, a system for rapid defragmentation of a fragmented storage volume in a computing environment is provided. A processor device is in communication with the fragmented storage volume. A plurality of source data sets is copied by the processor device from the fragmented storage volume to a plurality of target data sets on an additional storage volume. The plurality of source data sets is placed by the processor device on the additional storage volume as the plurality of target data sets in an unfragmented order. A first volume serial number (VOLSER) of the fragmented storage volume is swapped by the processor device with a second VOLSER of the additional storage volume. The fragmented storage volume is varied offline, and the additional storage volume is varied online. The computing environment recognizes the additional storage volume having the plurality of target data sets placed in the unfragmented order.

In an additional embodiment, again by way of example only, a computer program product for rapid defragmentation of a fragmented storage volume in a computing environment is provided. The computer program product comprises a computer-readable storage medium having computer-readable program code portions stored therein. The computer-readable program code portions comprise a first executable portion for copying a plurality of source data sets from the fragmented storage volume to a plurality of target data sets on an additional storage volume, the plurality of source data sets placed on the additional storage volume as the plurality of target data sets in an unfragmented order, swapping a first volume serial number (VOLSER) of the fragmented storage volume with a second VOLSER of the additional storage volume, and varying the fragmented storage volume offline, and varying the additional storage volume online. The computing environment recognizes the additional storage volume having the plurality of target data sets placed in the unfragmented order.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The present description and claimed subject matter describe exemplary system, method, and computer program product embodiments for rapid defragmentation of a fragmented storage volume in a computing environment. Rather than performing the defragmentation over several passes on the same fragmented volume, these embodiments utilize an additional storage volume to perform the defragmentation functionality. The fragmented data sets on the fragmented volume are moved to the additional volume and consolidated. The serializations of the two volumes are then swapped, and the original volume is taken offline, so the computer system recognizes the new volume with the defragmented data sets as the original volume. By implementing an additional volume to perform the defragmentation, the need to perform several passes against data sets in a single volume is eliminated, and the amount of time necessary to perform the defragmentation is substantially reduced.

Figure 1:
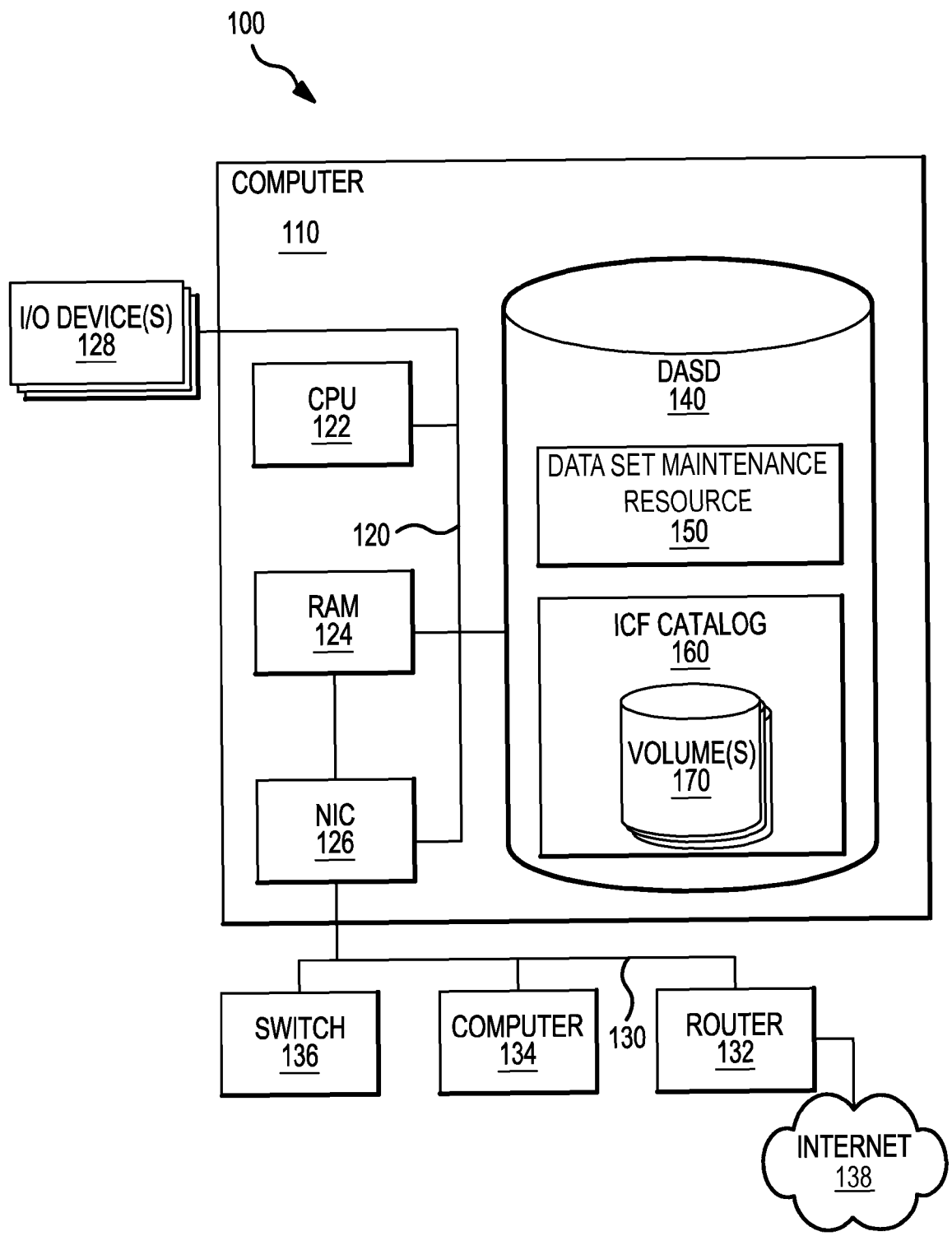
FIG. 1 is an exemplary computing environment.

FIG. 1 depicts one embodiment of a computer system for rapid defragmentation in accordance with the present invention. The computer system 100 includes a mainframe computer 110, a system bus 120, a central processing unit (CPU) 122, a random access memory (RAM) 124, a network interface card (NIC) 126, input/output (I/O) devices 128, a network 130, a router 132, a computer 134, a switch 136, the Internet 138, a direct access storage device (DASD) 140, a data set maintenance resource 150, an integrated catalog facility (ICF) catalog 160, and one or more volumes 170.

The depicted computer 110 houses the system bus 120. The system bus 120 may provide a communication link among components within the mainframe computer 110 such as the CPU 122, the RAM 124, the NIC 126, and the DASD 140. In one embodiment, the CPU processes and transmits data received over the system bus 120 from and to components connected to the system bus 120. The system bus 120 may provide a communication link to peripheral devices such as I/O devices 128.

The I/O devices 128 may communicate with the mainframe computer 110 via the system bus 120. The I/O devices 128 may provide a communication channel from the computer 110 to a user. Each I/O device 128 may individually include a monitor, a keyboard, a mouse, or the like.

The network interface card 126 may communicate with devices external to the mainframe computer 110 via the network 130. In one embodiment, the network interface card 126 provides a communication link between the system bus 120 and the network 130, thus allowing the computer 110 to communicate with devices on the network 130. Such devices may comprise the computer 134, the switch 136, or the router 132. The computer 134 may be another computer 110, a workstation, a server, or the like. The router 124 may have a connection from the network 130 to the Internet 138.

The depicted DASD 140 may reside as a component in the mainframe computer 110. In one embodiment, the DASD 140 stores part of the data set maintenance resource 150. In the depicted embodiment, the data set maintenance resource 150 is housed entirely within the DASD 140. The DASD 140 may also store part of the ICF catalog 160. In the depicted embodiment, the ICF catalog 160 is housed entirely within the DASD 140. The ICF catalog 160 may comprise volumes 170. Volumes 170 may comprise data regarding data sets (i.e., metadata) as well the data sets themselves.

The ICF catalog 160 stores information about other data sets. In one embodiment, the ICF catalog 160 is a data set storing information about other data sets. This information may include data set attributes as well as data set locations to facilitate retrieving a desired data set only by name without requiring a user to specify the data set's location.

Figure 2:
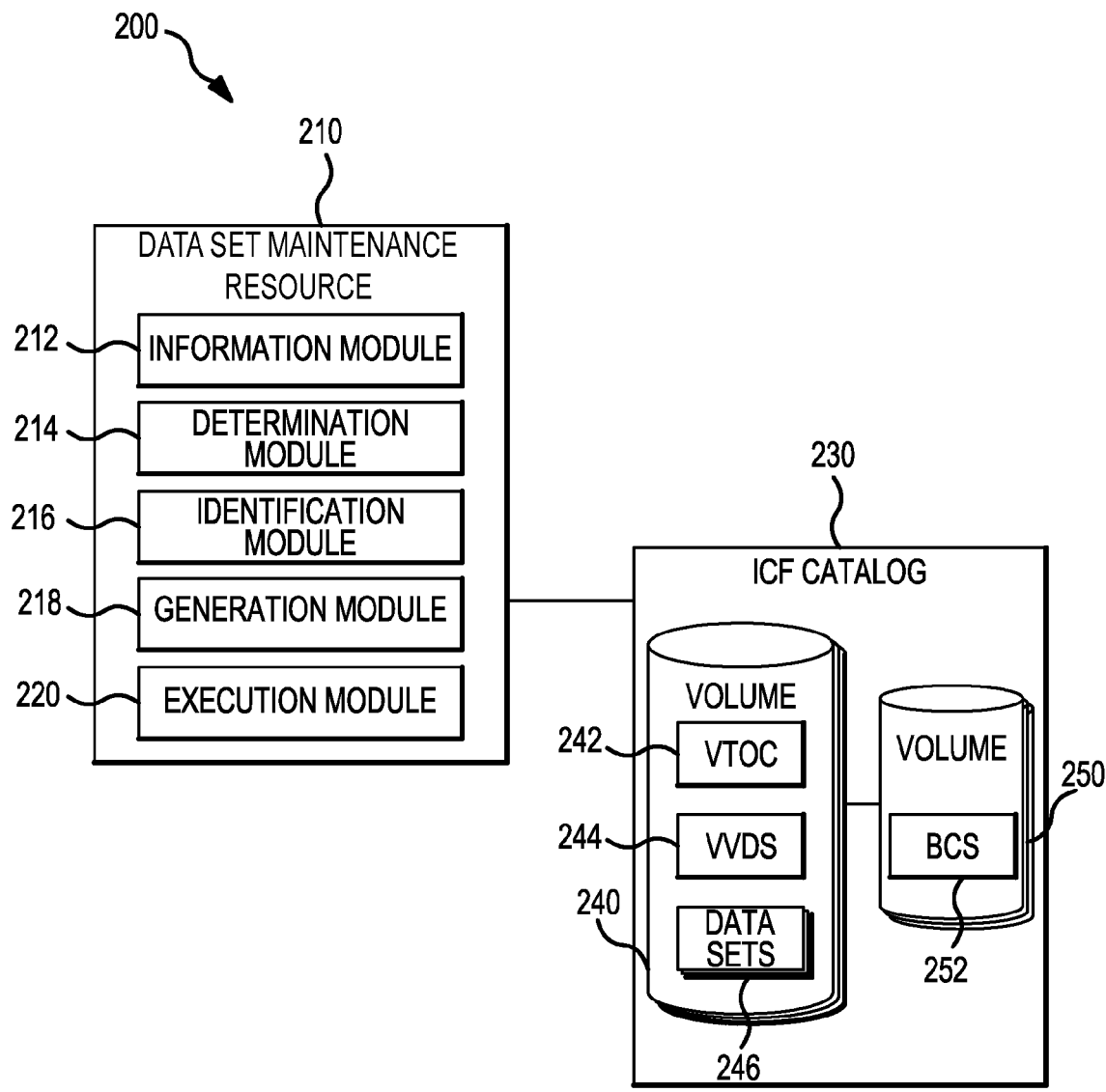
FIG. 2 is an exemplary data set maintenance resource for performing defragmentation functionality.

FIG. 2 depicts one embodiment of a DASD environment comprising a defragmentation resource and an integrated catalog facility (ICF) catalog in accordance with the present invention. The DASD environment 200 includes a data set maintenance resource 210, an information module 212, a determination module 214, an identification module 216, a generation module 218, an execution module 220, an integrated catalog facility (ICF) catalog 230, a volume 240, a volume table of contents (VTOC) 242, a VSAM volume data set (VVDS) 244, data sets 246, a volume 250, and a basic catalog structure (BCS) 252.

In the depicted embodiment, the data set maintenance resource 210 includes the information module 212, the determination module 214, the identification module 216, the generation module 218, and the execution module 220. One or more of these modules may be adapted for performing volume defragmentation functionality as will be described below. The data set maintenance resource 210 may execute the preceding modules. In one embodiment, the data set maintenance resource 210 receives control statements from a director. A director may be a person, process, or application configured to provide a set of control statements. Control statements are a set of commands for the computer system. One example of control statements are Job Control Language (JCL) control statements. These statements identify the user, indicate what processes are to be run, what resources are required, and what priority to allocate to the job.

The information module 212 may retrieve information regarding data sets 246 on a volume 240 from the VTOC 242. The information retrieved by the information module 212 may include identification of one or more designated volumes. In one embodiment, control statements from the director are examined by the information module 212 to identify the designated volume. Control statements may be used to identify a function to be performed by a selected program or utility. Control statements may also be used to identify specific volumes or data sets to be maintained or processed pursuant to defragmentation.

Other information retrieved by the information module may include a data set name, catalog status, the type entry in the catalog such as the type of data set or the VSAM index of a VSAM data set, or associated data set names if applicable. The information retrieved may further include identification of data sets to bypass during the defragmentation.

In one embodiment, the information module 212 runs an IEHMAP utility to read the VTOC 242. IEHMAP is a utility that will analyze a volume and print a report showing the exact location of each extent of all the data sets on the volume. The IEHMAP utility may generate a report of the contents of the VTOC 242. In this embodiment, the information module 212 passes IEHMAP the initial control statements generated by the director and IEHMAP identifies the volumes 240 and 250 to perform maintenance on based on those control statements. The information obtained from the information module 212 may be gathered in a report where information may be extracted.

In the depicted embodiment, the determination module 214 determines one or more defragmentation operations to perform. The determination module 214 may VTOC and/or VVDS information to determine the one or more volume defragmentation operations to perform. The determination module 214 may use the information obtained from the information module 212 for further determination in the data set maintenance resource 210.

The identification module 216 may identify related data sets by using an association identifier. The association identifier may be included with the information retrieved from the information module 212. The association identifier may be a name of a cluster of data sets.

In one embodiment, the generation module 218 generates one or more control statements for performing one or more defragmentation operations on the data sets 246. The control statements may be run by a plurality of utilities which require syntactically different control statements; in this situation, the control statements must be generated to be executed by a selected utility. The type of data set being maintained may determine the utility to generate control statements for. In one embodiment, the determination module 214 determines what defragmentation operations to perform on the data sets 246. The generation module 218 may generate control statements based on the determination of the defragmentation operations to perform by the determination module 214 as will be further described.

The execution module 220 executes the one or more generated control statements to perform defragmentation operations on the volume 240. In one embodiment, the execution module 220 selects a utility to execute the generated control statement with, such as the aforementioned Data Set Services (DFSMSdss) utility.

The ICF catalog 230 may include the volumes 240 and 250. In the depicted embodiment, volume 240 includes the VTOC 242, the VSAM volume data set (VVDS) 244 and the data sets 246. Also in the depicted embodiment, volume 250 includes the basic catalog structure (BCS) 252. In the depicted embodiment, both the ICF catalog 230 and the data set maintenance resource 210 reside on the DASD 140. The data set maintenance resource 210 may act on the ICF catalog 230 and its components to perform defragmentation operations.

The data set maintenance resource 210 utilizes the VTOC 242 to obtain information about volume 240 and data sets 246. The VTOC 242 may store certain information regarding data sets such as data set attributes and a description, which may include size, location, and extent information. The VVDS 244 may also be used by the data set maintenance resource 210 to obtain information regarding data sets 246.

Data sets 246 are collections of logically related data records. Data sets 246 may include both VSAM and non-VSAM data sets. Virtual storage access method (VSAM) is an IBM® disk file storage scheme used in mainframe computer operating systems. The VSAM storage scheme has been implemented throughout operating systems utilizing the MVS (Multiple Virtual Storage) architecture. The MVS architecture originated in the MVS 24-bit IBM® operating system, which has evolved into the present z/OS® 64-bit IBM® operating system.

The VVDS 244 may be considered an extension of the VTOC 242. The VVDS 244 may store information about VSAM and non-VSAM data sets. Information not stored in the VTOC 242 may be stored in the VVDS 244 such as VSAM data set attributes, VSAM data set catalog name, and non-VSAM data set catalog name.

The BCS 252 may also be used by the data set recovery resource 210 to obtain information regarding data sets 246. The information that may be stored on the BCS 252 is a volume the data set resides on, a data set type, a data set association, and ownership of the data set. In one embodiment, the BCS 252 points to multiple VSAM Volume Data Sets and, consequently, to multiple Volume Table of Contents; the relationship between the BCS 252, VVDS 244, and VTOC 242 is not exclusive.

Figure 3:
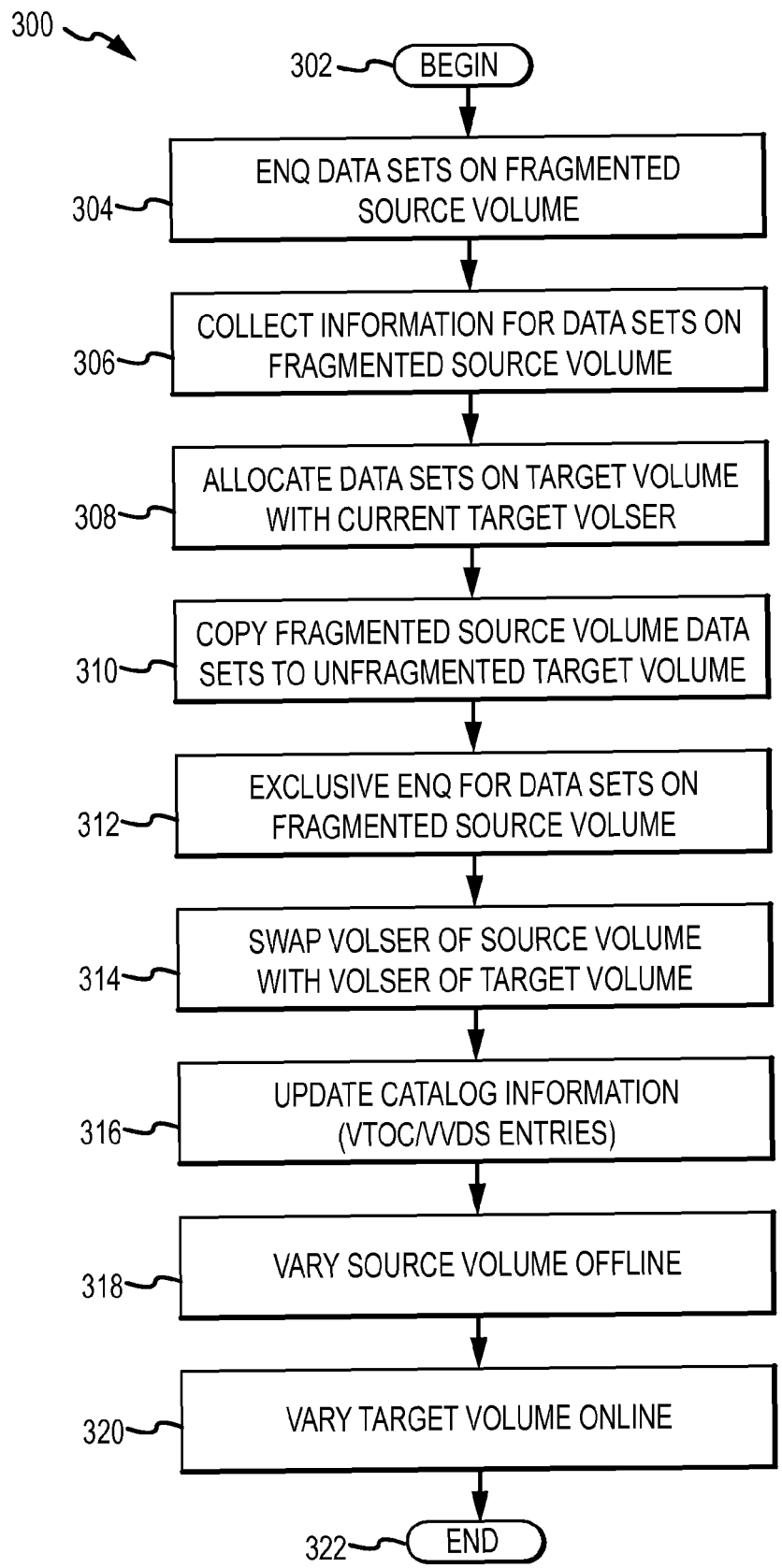
FIG. 3 is a flow chart diagram of an exemplary method for rapid defragmentation of a fragmented storage volume in a computing environment.

The following methodology may be implemented by the data set maintenance resource 210 to perform a rapid defragmentation of a fragmented storage volume. The skilled artisan will bear in mind, however, that various steps in the following description, figures, and claimed subject matter may be executed and/or carried out in differing orders according to a particular implementation. For example, the following methodology describes one exemplary order. FIG. 3, following, will illustrate the following methodology in an additional exemplary order.

As a preliminary matter, the client may code a DFSMSdss COPY request with a new keyword. In one embodiment, this keyword may be COPYDEFRAG. The remainder of the client JCL would remain the same as the client's existing COPY JCL. This COPY JCL may include a data set filter list of two asterisks with a source and a target volume serial number. This data set filter list indicates that all data on the source volume is to be moved to the target volume.

The target volume that a user specifies is a different volume serial number (VOLSER) from the source. This different volume is a new volume that, in one embodiment, contains only the standard indexed VTOC and VVDS entries. The COPYDEFRAG job receives a hardware reserve on the target volume to ensure that an additional user will not modify information on the target volume.

Pursuant to standard serialization functionality of DFSMSdss, a shared enqueue (ENQ) may be placed on the source data sets on the fragmented source volume. An ENQ is a lock that coordinates access to a resource. The ENQ placed on the source data sets allows the user to read data, but not update the data during the ENQ period. DFSMSdss standard functionality to build a set of control blocks which map the location of each data set on the source volume may be modified to allow the build of all source control blocks, including the extents on the volume and data set characteristic information such as data set type before allocating the target data sets or performing I/O on the data sets. This also provides the information needed to allocate the target volume data sets when the source volume does not technically exist as a normally accessible volume later in processing.

As a next step, the shared ENQs on the source volume data sets are upgraded to exclusive ENQs to take exclusive control over these data sets, as the VOLSER for the source volume will be changed. The target volume serial number is then changed with a utility request such as ICKDSF REFORMAT. ICKDSF REFORMAT clips the volume serial number on the source and the target volume, so that the source and target volume serial numbers have now swapped.

Following the swapping of VOLSERS of source and target volumes, the ICF catalog information is also changed to reflect the alteration. For example, the VTOC and VVDS names are also altered to have the new volume serial, since these names have the volume serial number in the name. At this point all of the data is still on the original volume, but the volume serial numbers have been swapped.

Each of the data sets on the target volume, which now has the source volume serial number, has been allocated. This provides the target extent range Cylinder Cylinder and Head Head (CCHH) for each data set to use later in the I/O. If the volume is system managed storage (SMS), an allocation parameter may be passed to SMS to force the SMS to go to the volume serial number specified, in similar fashion to the current guaranteed space setting in SMS.

The next step is to perform the I/O from the original source to the original target, where a fast replication technique may be used if available, such as FlashCopy. DFSMSdss then builds the from and to blocks for extent ranges to be moved from the original source to the new location on the target volume, and passes those to the appropriate fast replication method. When the data movement has completed virtually, the hardware reserves are released on both volumes. The original target volume now appears to be a defragmented version of the source volume. The original source volume now has the original target scratch VOLSER and can be reused in a succeeding defragmentation.

Turning to FIG. 3, a logic flow diagram of an exemplary method 300 for performing rapid defragmentation of a fragmented storage volume in a computing environment is depicted. As described above, method 300 illustrates an alternative order of the methodology previously described. As one skilled in the art will appreciate, the described method may be implemented by various means, such as hardware, software, firmware, or a combination thereof operational on or otherwise associated with the computing environment. For example, the method 300 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 300 begins (step 302) with a shared ENQ placed on data sets on the fragmented source volume to place the data sets in a read-only state (step 304). As a next step, information for the fragmented data sets is collected (step 306). In step 308, data sets on the target volume are allocated with the current target volume serial number (VOLSER). I/O is then performed, and the fragmented data sets are replicated on the target volume in an unfragmented configuration (step 310). Here again, a fast replication mechanism such as FlashCopy may be utilized.

Control then moves to step 312, where the shared ENQ for the source volume data sets is upgraded to an exclusive ENQ. Using one of several available serialization techniques, such as ICKDSF REFORMAT to clip the VOLSERS on the source and the target volume and effectively swap the VOLSERS (step 314). ICF catalog information, such as VTOC/VVDS entries are then updated (step 316), and the source volume is varied offline (step 318) and the target volume is varied online (step 320). The method 300 then ends (step 322).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for rapid defragmentation of a fragmented storage volume in a computing environment, comprising:
   (a) copying a plurality of source data sets from the fragmented storage volume to a plurality of target data sets on an additional storage volume, wherein the plurality of source data sets are placed on the additional storage volume as the plurality of target data sets in an unfragmented order;
   (b) swapping a first volume serial number (VOLSER) of the fragmented storage volume with a second VOLSER of the additional storage volume; and
   (c) varying the fragmented storage volume offline, and varying the additional storage volume online, wherein the computing environment recognizes the additional storage volume having the plurality of target data sets placed in the unfragmented order.

2. The method of claim 1, wherein step (a) is performed subsequent to step (b).

3. The method of claim 1, further including updating a catalog entry associated with the fragmented storage volume with information of the second VOLSER.

4. The method of claim 3, wherein updating the catalog entry associated with the fragmented storage volume with the information of the second VOLSER includes updating at least one of a volume table of contents (VTOC) index and a VSAM volume data set (VVDS) entry.

5. The method of claim 1, further including issuing an ENQ request to the plurality of source data sets to place the plurality of source data sets in a read-only access mode.

6. The method of claim 5, further including collecting information for the plurality of source data sets.

7. The method of claim 6, further including allocating the plurality of target data sets on the additional storage volume to coincide with the plurality of source data sets.

8. The method of claim 7, further including issuing an exclusive ENQ request to the plurality of source data sets to obtain exclusive control of the plurality of source data sets.

9. A system for rapid defragmentation of a fragmented storage volume in a computing environment, comprising:
   a processor device in communication with the fragmented storage volume, wherein the processor device is adapted for:
   (a) copying a plurality of source data sets from the fragmented storage volume to a plurality of target data sets on an additional storage volume, wherein the plurality of source data sets are placed on the additional storage volume as the plurality of target data sets in an unfragmented order,
   (b) swapping a first volume serial number (VOLSER) of the fragmented storage volume with a second VOLSER of the additional storage volume, and
   (c) varying the fragmented storage volume offline, and varying the additional storage volume online, wherein the computing environment recognizes the additional storage volume having the plurality of target data sets placed in the unfragmented order.

10. The system of claim 9, wherein the processor device is further adapted for updating a catalog entry associated with the fragmented storage volume with information of the second VOLSER.

11. The system of claim 9, wherein the processor device is further adapted for issuing an ENQ request to the plurality of source data sets to place the plurality of source data sets in a read-only access mode.

12. The system of claim 11, wherein the processor device is further adapted for collecting information for the plurality of source data sets.

13. The system of claim 12, wherein the processor device is further adapted for allocating the plurality of target data sets on the additional storage volume to coincide with the plurality of source data sets.

14. The system of claim 13, wherein the processor device is further adapted for issuing an exclusive ENQ request to the plurality of source data sets to obtain exclusive control of the plurality of source data sets.

15. A computer program product for rapid defragmentation of a fragmented storage volume in a computing environment, the computer program product comprising a computer-readable storage medium having computer-readable program code portions stored therein, the computer-readable program code portions comprising:

a first executable portion for:
  (a) copying a plurality of source data sets from the fragmented storage volume to a plurality of target data sets on an additional storage volume, wherein the plurality of source data sets are placed on the additional storage volume as the plurality of target data sets in an unfragmented order,
  (b) swapping a first volume serial number (VOLSER) of the fragmented storage volume with a second VOLSER of the additional storage volume, and
  (c) varying the fragmented storage volume offline, and varying the additional storage volume online, wherein the computing environment recognizes the additional storage volume having the plurality of target data sets placed in the unfragmented order.

16. The computer program product of claim 15, further including a second executable portion for updating a catalog entry associated with the fragmented storage volume with information of the second VOLSER.

17. The computer program product of claim 15, further including a second executable portion for issuing an ENQ request to the plurality of source data sets to place the plurality of source data sets in a read-only access mode.

18. The computer program product of claim 17, further including a third executable portion for collecting information for the plurality of source data sets.

19. The computer program product of claim 18, further including a fourth executable portion for allocating the plurality of target data sets on the additional storage volume to coincide with the plurality of source data sets.

20. The computer program product of claim 19, further including a fifth executable portion for issuing an exclusive ENQ request to the plurality of source data sets to obtain exclusive control of the plurality of source data sets.

* * * * *